(12) United States Patent
Takada

(10) Patent No.: US 9,986,239 B2
(45) Date of Patent: May 29, 2018

(54) IMAGE ENCODING APPARATUS, IMAGE ENCODING METHOD, AND RECORDING MEDIUM

(71) Applicant: NEC Corporation, Tokyo (JP)

(72) Inventor: Jun Takada, Tokyo (JP)

(73) Assignee: NEC CORPORATION, Tokyo (JP)

(*) Notice: Subject to any disclaimer, the term of this patent is extended or adjusted under 35 U.S.C. 154(b) by 215 days.

(21) Appl. No.: 14/780,114

(22) PCT Filed: Jan. 27, 2014

(86) PCT No.: PCT/JP2014/000379
§ 371 (c)(1),
(2) Date: Sep. 25, 2015

(87) PCT Pub. No.: WO2014/155919
PCT Pub. Date: Oct. 2, 2014

(65) Prior Publication Data
US 2016/0044311 A1 Feb. 11, 2016

(30) Foreign Application Priority Data
Mar. 27, 2013 (JP) ................. 2013-067035

(51) Int. Cl.
H04N 19/115 (2014.01)
H04N 19/174 (2014.01)
H04N 19/167 (2014.01)

(52) U.S. Cl.
CPC ......... *H04N 19/115* (2014.11); *H04N 19/167* (2014.11); *H04N 19/174* (2014.11)

(58) Field of Classification Search
None
See application file for complete search history.

(56) References Cited

U.S. PATENT DOCUMENTS 8,224,099 B2 7/2012 Mitsuhashi et al.
2004/0027375 A1 2/2004 Ellis et al.
(Continued)

FOREIGN PATENT DOCUMENTS

JP 2001-86501 3/2001
JP 2004-503862 2/2004
(Continued)

OTHER PUBLICATIONS

International Search Report for International Application No. PCT/JP2014/000379 dated Apr. 8, 2014.
(Continued)

*Primary Examiner* — Tung Vo
*Assistant Examiner* — Joseph Becker
(74) *Attorney, Agent, or Firm* — Young & Thompson

(57) ABSTRACT

Provided is an image encoding apparatus capable of encoding a region important to a user with high quality. An update interval index calculation unit calculates an update interval index representing an index having a long update interval in an entire update tile overlapping the update region for each update region. An importance region specification unit specifies an important region, from each update region by using the update interval index. An quality control unit allocates a code amount, which is larger than a result obtained by dividing the total target code amount per one frame proportionally according to a ratio of an area of an entire important region with respect to an area of an entire update region, as a target code amount of the entire important region and specifies a quality value of the entire important region on the basis of the target code amount.

20 Claims, 10 Drawing Sheets

(56) References Cited

U.S. PATENT DOCUMENTS

| | | | | |
|---|---|---|---|---|
| 2009/0002507 | A1* | 1/2009 | Fukuhara | H01L 27/14609 348/222.1 |
| 2009/0110063 | A1* | 4/2009 | Nakayama | H04N 19/176 375/240.03 |
| 2011/0276653 | A1* | 11/2011 | Matsui | H04N 19/176 709/217 |
| 2012/0169842 | A1* | 7/2012 | Chuang | G08B 13/19619 348/39 |

FOREIGN PATENT DOCUMENTS

| | | |
|---|---|---|
| JP | 2004-320479 | 11/2004 |
| JP | 2005-33762 | 2/2005 |
| JP | 2008-085502 | 4/2008 |
| JP | 2010-171876 | 8/2010 |
| JP | 2010-206753 | 9/2010 |
| JP | 2011-238014 | 11/2011 |
| WO | 2009/004996 | 1/2009 |

OTHER PUBLICATIONS

Japanese Decision to Grant a Patent dated Feb. 27, 2018 in corresponding Japanese Patent Application No. 2015-507979 with JPO machine translation of Decision to Grant a Patent.

* cited by examiner

IMAGE ENCODING APPARATUS, IMAGE ENCODING METHOD, AND RECORDING MEDIUM

TECHNICAL FIELD

The present invention relates an image encoding apparatus, an image encoding method, and an image encoding program, by which an image is encoded.

BACKGROUND ART

Various systems including a server and a thin client which transmit/receive an image have been proposed (for example, see Patent Literature 1). As a server that transmits an image to the thin client, for example, there has been proposed a server that encodes and transmits image data of a rectangular region including an updated region of an image (for example, see Patent Literature 2). According to such a transmission scheme, when only a part of an image has been updated, it is sufficient if the server encodes only image data of some regions and transmits the encoded image data to the thin client. Accordingly, it is possible to reduce the amount of transmission data.

Furthermore, when the server transmits image data to the thin client via a transmission network, there is a case in which the server encodes the image data in order to compress a data amount (for example, see Patent Literature 3). When the server uses irreversible conversion such as quantization at the time of data compression, there is a case in which the quality of a decoded image at a reception side is degraded as compared with the original image of a transmission side. Furthermore, even when data deficiency or a transmission error has occurred in a transmission path and the like, there is a case in which image quality of a received image is degraded. In order to prevent the degradation of the image quality from being transmitted to a subsequent frame, there has been proposed a scheme in which the server regularly inserts an intra update (intra refresh) signal into an image and transmits the image (for example, see Patent Literature 4). Herein, when an entire frame is encoded, a code amount is significantly increased. Therefore, in general, in the case of performing intra update, the server divides a frame into a plurality of partial regions (tiles) and transmits the tiles little by little.

For example, the device disclosed in Patent Literature 4 transmits a code of an update region and then performs the intra update in the range of a surplus band while making a round of a low quality tile. Therefore, even when an area of an update region of a frame has been largely changed, an area of a region to be subjected to intra update is changed, so that it is possible to achieve high quality while sufficiently utilizing the surplus band. For example, in a frame not updated from a previous frame or a frame in which an area of an update region is small, the server can perform intra update with respect to many tiles as far as they are included in the surplus band. Furthermore, the server preferentially performs intra update for a tile of a region encoded with low quality or a tile not updated for a long time, so that it is possible to shorten a period in which a low quality tile remains in an image.

Furthermore, Patent Literature 5 discloses an image transmission system that determines a transmission priority for each update region and transmits an update region in a priority order.

Hereinafter, a general encoding process will be described using a detailed example. FIG. 9 illustrates an example of a frame in which some regions have been updated. When a frame 91 and a frame (not illustrated) prior to the frame 91 have been compared with each other, it is assumed that regions A to C have been updated in the frame 91. It is sufficient if the server encodes only the regions A to C and transmits the frame 91 to the thin client. Herein, the server divides a communication band by a target frame rate and calculates a target code amount. Furthermore, on the basis of a data amount before compression of the update regions A to C and the target code amount, the server calculates a target compression rate. For example, it is assumed that a communication band is 3000 kbps (kbit per second) and the target frame rate is 30 fps (frames per second). Then, the server obtains 100 kbit/frame as the target code amount. Furthermore, it is assumed that the data amount before compression of the update regions A to C is 1402 kbit. Then, the server obtains about 1/14 as the target compression rate. The server compresses image data of the update regions A to C at the target compression rate and transmits the compressed image data to the thin client.

Furthermore, general intra update will be described using a detailed example. FIG. 10 is a schematic diagram illustrating an example of a change in the state of continuous frames. One frame has been divided into tiles 95 with a predetermined size. It is assumed that a region 96 has been updated in a frame 1 and a region 97 has been updated in a next frame 2. Furthermore, in the present example, the quality of a place, where update has occurred, is assumed to be degraded in order to simplify a description. In FIG. 10, tiles with degraded quality are represented with a dotted pattern. Furthermore, tiles with high quality are represented with a white color. The server encodes each tile related to the region 96 of the frame 1 and transmits the encoded tiles to the thin client. Similarly, in relation to the next frame 2, the server encodes each tile related to the region 97 and transmits the encoded tiles to the thin client. At the time of transmission of the frames 1 and 2, it is assumed that a surplus band has not existed.

In subsequent frames 3 to 16, it is assumed that an update region has not been generated. Then, the server does not perform encoding and transmission of an update region in relation to the frames 3 to 16. The server performs intra update in a surplus band generated by performing no encoding and transmission. FIG. 10 illustrates the case in which the server performs intra update in one frame by one tile. As illustrated in FIG. 10, the server makes a round of tiles with degraded quality for the frames 3 to 16 and performs intra update. As a consequence, in the frame 16, the number of tiles with degraded quality is reduced as compared with the frame 2. In the example illustrated in FIG. 10, the priority of the intra update of the tiles with degraded quality becomes high toward tiles positioned at an upper end of a screen. Furthermore, in tiles of the same stage, the priority becomes high toward left tiles when viewed from a user.

CITATION LIST

Patent Literature

[PTL 1] Published Japanese Translation No. 2004-503862
[PTL 2] Japanese Laid-open Patent Publication No. 2008-85502
[PTL 3] Japanese Laid-open Patent Publication No. 2004-320479
[PTL 4] Japanese Laid-open Patent Publication No. 2010-206753
[PTL 5] International Search Report 2009/004996 Pamphlet

SUMMARY OF INVENTION

Technical Problem

In the aforementioned general encoding process, the server encodes each update region (for example, the regions A to C illustrated in FIG. 9) of one frame at the target compression rate. As a consequence, qualities of each update region of one frame are equal to each other.

However, in general, in an image, there exist regions important to a user and regions not important to the user. For example, a window being operated by a user or a region related to a menu item displayed in response to a tool bar operation by the user includes various pieces of information important for an operation. Therefore, it is preferable that such a region is encoded so as to have higher quality.

As described above, in an encoding scheme in which qualities of each update region of one frame become equal to each other, the case in which it is not possible to sufficiently elevate the quality of a region important to a user may occur. When it is not possible to sufficiently elevate the quality of an important region, it is difficult for a user to understand display content.

Therefore, it is an object of the present invention to provide an image encoding apparatus, an image encoding method, and an image encoding program, by which it is possible to encode a region important to a user with high quality.

Solution to Problem

An image encoding apparatus according to the present invention includes a tile information storage means which stores an update time of a tile which is a region obtained by dividing a frame of an image into a predetermined size; an update region detection means which detects an update tile, which is a tile in which update occurs between a latest frame and a frame before the latest frame, and an update region, which is a region where update occurs, when the latest frame of the image has been provided; an update interval index calculation means which calculates an update interval index representing an index having a long update interval in an entire update tile overlapping the update region, for each update region; an importance region specification means which specifies an important region from each update region by using the update interval index; a quality control unit means which allocates a code amount, which is larger than a result obtained by dividing a total target code amount per one frame proportionally according to a ratio of an area of an entire important region with respect to an area of an entire update region, as a target code amount of the entire important region and specifies a quality value of the entire important region on the basis of the target code amount; and an importance region encoding means which encodes the entire important region with the quality value.

Furthermore, an image encoding method according to the present invention includes the steps of: detecting an update tile, which is a tile in which update occurs between a latest frame and a frame before the latest frame, and an update region, which is a region where update occurs, when the latest frame of an image has been provided; storing an update time of an update tile at a time of detection of the update tile and storing an update time for each tile; calculating an update interval index representing an index having a long update interval in an entire update tile overlapping the update region, for each update region; specifying an important region from each update region by using the update interval index; allocating a code amount, which is larger than a result obtained by dividing a total target code amount per one frame proportionally according to a ratio of an area of an entire important region with respect to an area of an entire update region, as a target code amount of the entire important region and specifying a quality value of the entire important region on the basis of the target code amount; and encoding the entire important region with the quality value.

Furthermore, an image encoding program according to the present invention is an image encoding program, which is applied to a computer including a tile information storage means which stores an update time of a tile which is a region obtained by dividing a frame of an image into a predetermined size, and causes the computer to execute: an update region detection process of detecting an update tile, which is a tile in which update occurs between a latest frame and a frame before the latest frame, and an update region, which is a region where update occurs, when the latest frame of the image has been provided; an update interval index calculation process of calculating an update interval index representing an index having a long update interval in an entire update tile overlapping the update region, for each update region; an importance region specification process of specifying an important region from each update region by using the update interval index; a quality control unit process of allocating a code amount, which is larger than a result obtained by dividing a total target code amount per one frame proportionally according to a ratio of an area of an entire important region with respect to an area of an entire update region, as a target code amount of the entire important region and specifying a quality value of the entire important region on the basis of the target code amount; and an importance region encoding process of encoding the entire important region with the quality value.

Advantageous Effects of Invention

According to the present invention, it is possible to encode a region important to a user with high quality.

DESCRIPTION OF EMBODIMENTS

Hereinafter, an exemplary embodiment of the present invention will be described with reference to the drawings.

In addition, in the following exemplary embodiment, it is assumed that an image change due to a moving image does not relate to update of display. A moving image display region may also be included in an image. However, in the following exemplary embodiment, in order to simplify a description, the case in which a display change other than a moving image occurs in an image will be described as an example. That is, the following description will be provided on the assumption that there is no display of a moving image.

Figure 1:
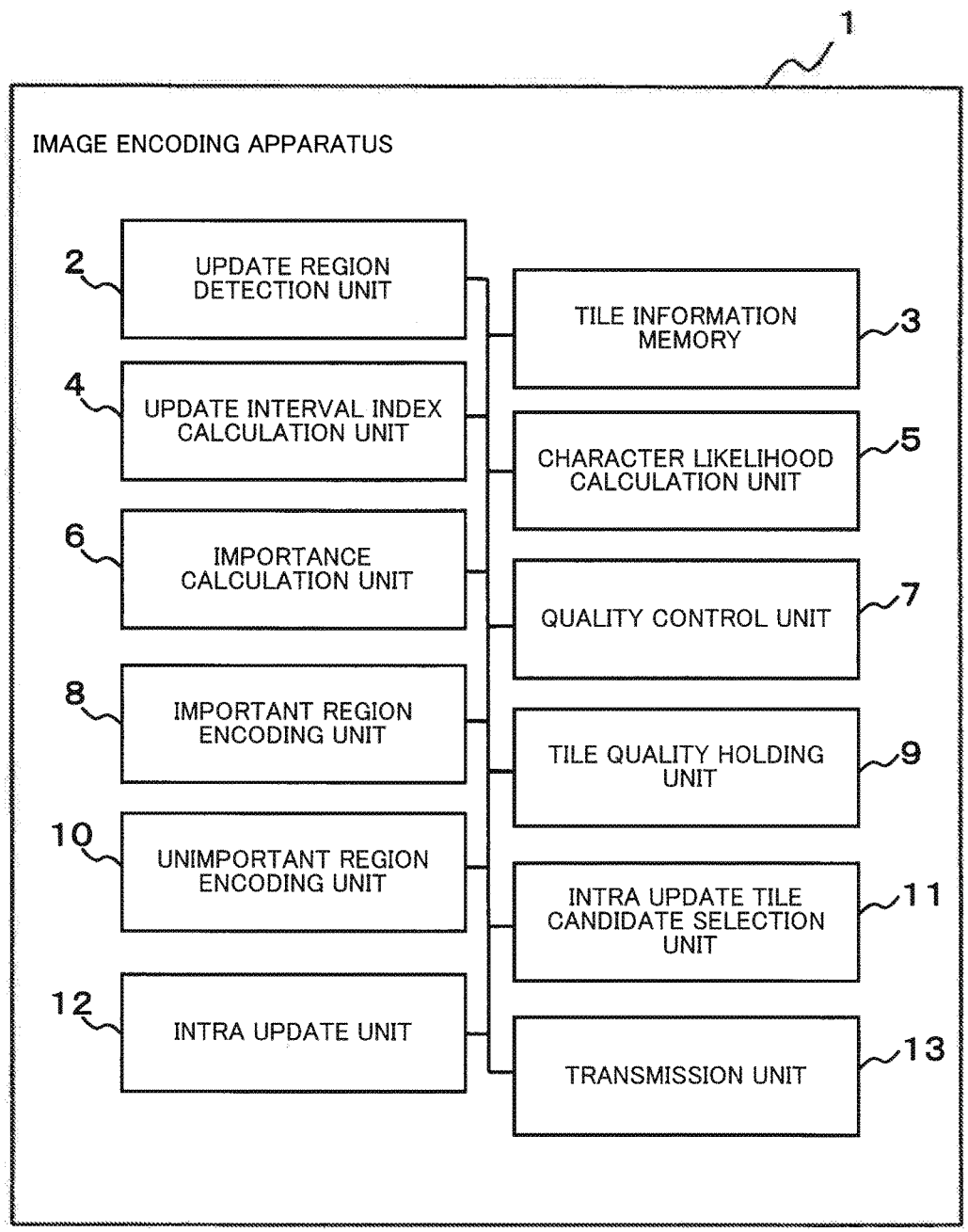
FIG. 1 is a block diagram illustrating an example of an image encoding apparatus of the present invention.

FIG. 1 is a block diagram illustrating an example of an image encoding apparatus of the present invention. An image encoding apparatus 1 of the present invention includes an update region detection unit 2, a tile information memory 3, an update interval index calculation unit 4, a character likelihood calculation unit 5, an importance calculation unit 6, a quality control unit 7, an important region encoding unit 8, a tile quality holding unit 9, an unimportant region encoding unit 10, an intra update tile candidate selection unit 11, an intra update unit 12, and a transmission unit 13.

The image encoding apparatus 1 sequentially captures a frame. The frame is divided into regions with a fixed size. Respective regions divided to have the fixed size are written as tiles. The size of the tile, for example, is 32 pixels lengthwise and 32 pixels breadthwise, but the size of the tile is not limited thereto.

The tile information memory 3 is a memory which stores information of an update time, an update interval, importance of a tile and the like for each tile. The update interval is a time from a previous update time to the latest update time in a target tile.

When the latest frame is captured, the update region detection unit 2 compares the latest frame with one previous frame, and detects an update tile from the latest frame. The update tile is a tile in which update of display occurs between the latest frame and a frame just before the latest frame. When the update tile is detected, the update region detection unit 2 rewrites the update time and the update interval of the tile stored in the tile information memory 3 into the latest information.

Furthermore, the update region detection unit 2 compares the latest frame with a frame just before the latest frame, calculates a boundary between an update region and a non-updated region in units of pixels, and specifies an update region.

Figure 2:
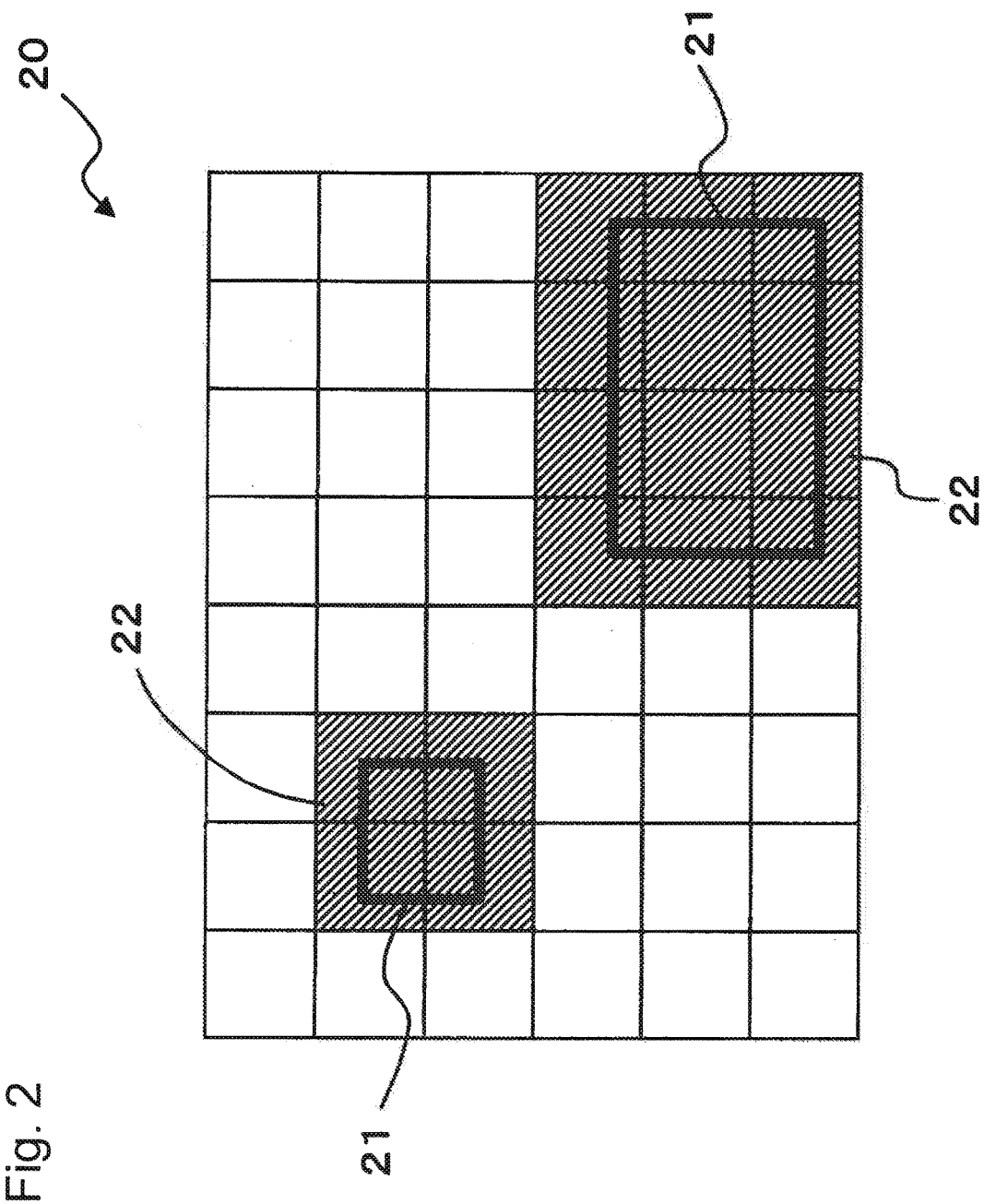
FIG. 2 is a schematic diagram illustrating an example of an update region and an update tile.

FIG. 2 is a schematic diagram illustrating an example of an update region and an update tile. An update region 21 is a region in which update of display has occurred between the latest frame 20 and a frame (not illustrated) just before the latest frame 20. In addition, FIG. 2 illustrates two update regions 21, but the number of update regions detected from one frame is not specifically limited thereto.

Furthermore, update of display in a frame is not performed in units of tiles. Therefore, as illustrated in FIG. 2, an outer periphery of the update region 21 does not coincide with a boundary between tiles. An update tile 22 is a tile in which update occurs in at least a part of pixels of the tile. In the example illustrated in FIG. 2, each tile 22 indicated by oblique lines relates to the update tile.

The update interval index calculation unit 4 calculates an update interval index for each update region. The update interval index is an index value indicating the length of an update interval in an entire update tile overlapping the update region. It is sufficient if an index, which has a value becoming large as an update interval becomes long as an entire tile overlapping the update region and a value becoming small as the update interval becomes short as the entire tile overlapping the update region, is used as the update interval index.

An example of the update interval index includes an occupation rate of a tile having a long update interval among each tile overlapping the update region. Herein, the tile having a long update interval is a tile in which the update interval is equal to or more than a predetermined threshold value. The threshold value is a threshold value for determining whether the update interval is long. Hereinafter, in the present exemplary embodiment, the case in which the update interval index calculation unit 4 calculates the occupation rate of the tile having a long update interval as the update interval index will be described as an example.

The update interval index calculation unit 4 calculates the occupation rate of the tile having a long update interval among each tile overlapping the update region for each update region. For example, it is assumed that the number of tiles overlapping a certain update region is a and the number of tiles having an update interval equal to or more than a threshold value among the tiles is b. It is sufficient if the update interval index calculation unit 4 calculates the occupation rate of the tile having a long update interval in the update region by calculation of b/a. The occupation rate of the tile having a long update interval in the update region can be called a long update interval tile occupation rate.

The character likelihood calculation unit 5 calculates character likelihood for each tile. The character likelihood is a value representing likelihood related to a character display region. It is considered that as the character likelihood is high, it relates to the character display region. The character likelihood calculation unit 5, for example, may also obtain a histogram of edge strength in a tile and employ a dispersion value thereof as the character likelihood. In general, the character display region includes both a pixel (a pixel serving as a boundary between a character and a background) having a very strong edge strength and a pixel (a pixel related to a monochromatic boundary) having a very weak edge strength. Accordingly, in the character display region, the dispersion value of the edge strength is a large value. Thus, the character likelihood calculation unit 5 may also calculate the dispersion value of the edge strength as the character likelihood.

Furthermore, the character likelihood calculation unit 5 also calculates character likelihood of an update region for each individual update region. In the case of calculating character likelihood of one update region, the character likelihood calculation unit 5 may also calculate a statistical value (for example, an average value, a maximum value, a minimum value and the like) of character likelihood of each tile overlapping the update region as the character likelihood of the update region.

The importance calculation unit 6 calculates importance representing the degree of importance in a user for each update region. The importance calculation unit 6 performs weighted addition of an update interval index and character likelihood for each update region, thereby calculating importance. In addition, in the present exemplary embodiment, the update interval index is the occupation rate of the tile having a long update interval. Moreover, the importance calculation unit 6 sorts respective update regions detected from the latest frame in an importance order and specifies an update region, which has importance equal to or more than a predetermined threshold value, as an important region. The threshold value is a threshold value for specifying the important region. The importance calculation unit 6 decides update regions (that is, update regions having importance smaller than the threshold value), except for the important region among the respective update regions detected from the latest frame, as unimportant regions. Accordingly, respective update regions are classified into any one of the important region and the unimportant region. In addition, regions, except for the update regions, do not relate to the important region and the unimportant region.

The fact that importance is high represents that the occupation rate or character likelihood of the tile having a long update interval is high. The fact that the number of tiles having a long update interval is large represents that a place not updated for a while has been suddenly updated. The fact that the place not updated for a while has been suddenly updated as described above and it is highly probable that a character will be expressed in the place can be said that it is a region where information important to a user is displayed. For example, a menu item and the like displayed in response to a tool bar operation are important to a user and have characteristics that they are suddenly displayed in a place not updated for a while or include a character. Thus, an update region updated as such menu item and the like is classified into the important region. On the other hand, a display region such as a banner unimportant to a user is updated at a relatively short interval. Furthermore, in many cases, no character is included in an icon and the like unimportant to a user. Thus, even though the display region such as the banner and the icon has been updated, the importance of the update region is low and is classified into the unimportant region.

Furthermore, the importance calculation unit 6 also calculates importance of each tile other than the update tile. It is sufficient if the importance of each tile other than the update tile is decided by a period from a previous update time to a time related to the latest frame and character likelihood. It is sufficient if the importance calculation unit 6 decides importance of a tile to be a large value as the period from the previous update time to the time related to the latest frame is long and the character likelihood is large.

The quality control unit 7 specifies a quality value allocated to the important region. The quality value is a value (an integer value) representing the degree of quality when image data has been encoded. As the quality value is high, a code amount after encoding is large and quality becomes good. In contrast, as the quality value is low, a code amount after encoding is small and quality becomes degraded. As the quality value, an upper limit value and a lower limit value are decided. An example of the quality value includes a Q value in JPEG (Joint Photographic Experts Group), but a quality value other than the Q value in the JPEG may also be used.

When deciding the quality value of the important region, the quality control unit 7 firstly calculates a target code amount of an entire important region. The quality control unit 7 divides the total target code amount in a frame proportionally according to a ratio (that is, an area of the entire important region/an area of the entire update region) of the area of the entire important region with respect to the area of the entire update region and adds a constant value (for example, 1000 bytes) to the proportional division result, thereby calculating the target code amount of the entire important region. This represents that the target code amount to be allocated to the entire important region is allocated (is made too much) to be higher than the ratio of the area of the entire important region with respect to the area of the entire update region. It is sufficient if the quality control unit 7 performs addition for the proportional division result such that the target code amount of the entire important region is higher than the result obtained by dividing the total target code amount in the frame proportionally according to "the area of the entire important region/the area of the entire update region". Accordingly, the quality control unit 7 may also perform the aforementioned constant addition or constant rate multiplication with respect to the proportional division result. In addition, the total target code amount in the frame is the total target code amount per one frame and it is sufficient if the total target code amount in the frame is decided in advance as a constant.

Furthermore, the quality control unit 7 obtains the quality value by using the target code amount of the entire important region. For example, the quality control unit 7 calculates dispersion of image signal values of the entire important region. The dispersion is a value representing the degree of complexity of the entire important region. It is sufficient if the quality control unit 7 specifies a quality value related to the target code amount and complexity of the entire important region. For example, the quality control unit 7 may also hold in advance a database indicating a correspondence relation among the target code amount, the complexity, and the quality value. Then, the quality control unit 7 may also specify the quality value related to the target code amount and complexity of the entire important region with reference to the database. The quality control unit 7, for example, may also hold, as the database, information indicating a correspondence relation between a quality value and a code amount for each individual complexity. In this case, the quality control unit 7 refers to the information indicating the correspondence relation between the quality value and the code amount, which relates to the calculated complexity, and specifies the quality value related to the target code amount from the information. The calculation method of the quality value is an example, and the quality control unit 7 may also derive the quality value by using other methods on the basis of the target code amount of the entire important region.

The important region encoding unit 8 encodes the entire important region on the basis of the quality value of the important region decided by the quality control unit 7.

The tile quality holding unit 9 holds quality values of individual tiles. After a quality value is decided for at least a part of regions of a tile, the tile quality holding unit 9 recalculates the quality value of the tile and holds the quality value of the tile. For example, it is assumed that the quality control unit 7 has decided the quality value for the important region as described above. Then, tile quality holding unit 9 updates a quality value of a tile included in the important region into the quality value of the important region. Furthermore, there is a case in which a part of one tile relates to the important region and another part relates to the unimportant region, so that quality values are respectively allocated to the part of one tile. In this case, tile quality holding unit 9, for example, holds a minimum value of these quality values as the quality value of the tile.

The intra update tile candidate selection unit 11 selects all tiles having a quality value equal to or less than a threshold value from tiles other than the update tiles. Hereinafter, the tile will be written as a low quality tile. Furthermore, the threshold value is a threshold value for selecting the low quality tile. The low quality tile is a tile serving as a candidate to be subjected to intra update.

Furthermore, the quality control unit 7 specifies the quality value of the unimportant region on the basis of a remaining band obtained by subtracting a code amount of a result obtained by encoding the entire important region 8 from the total target code amount in the frame. The quality control unit 7 obtains, as an initial value of a quality value, a quality value in the case of encoding an entire unimportant region by using all remaining bands. When the quality value of the unimportant region is lowered below the initial value thereof, the number of low quality tiles to be able to be subjected to intra update is increased. The quality control unit 7 reduces the quality value of the unimportant region from the initial value one by one, and calculates an optimal combination of the quality value of the unimportant region and a code amount (hereinafter, written as a code amount for tile retransmission) available for the transmission of the low quality tiles obtained by encoding for intra update. This operation will be described later.

The unimportant region encoding unit 10 encodes the entire unimportant region on the basis of the optimal quality value of the unimportant region decided by the quality control unit 7.

The intra update unit 12 encodes the low quality tiles in a descending order of importance within the range of the remaining band after the transmission of encoding results of the important region and the unimportant region. At this time, the intra update unit 12 encodes the low quality tiles with a quality value for intra update.

The transmission unit 13 transmits encoded data of the important region, encoded data of the unimportant region, and encoded data of the low quality tile to the thin client. In addition, transmission timings of these types of encoded data are different from one another. The transmission timings of the encoded data will be described later with reference to the flowchart of FIG. 3.

The update region detection unit 2, the update interval index calculation unit 4, the character likelihood calculation unit 5, the importance calculation unit 6, the quality control unit 7, the important region encoding unit 8, the tile quality holding unit 9, the unimportant region encoding unit 10, the intra update tile candidate selection unit 11, the intra update unit 12, and the transmission unit 13, for example, are realized by CPU (Central Processing Unit) of a computer that operates according to an image encoding program. In this case, the CPU loads the image encoding program and operates as the aforementioned each element according to the program. The image encoding program may also be stored in a computer readable recording medium.

Figure 3:
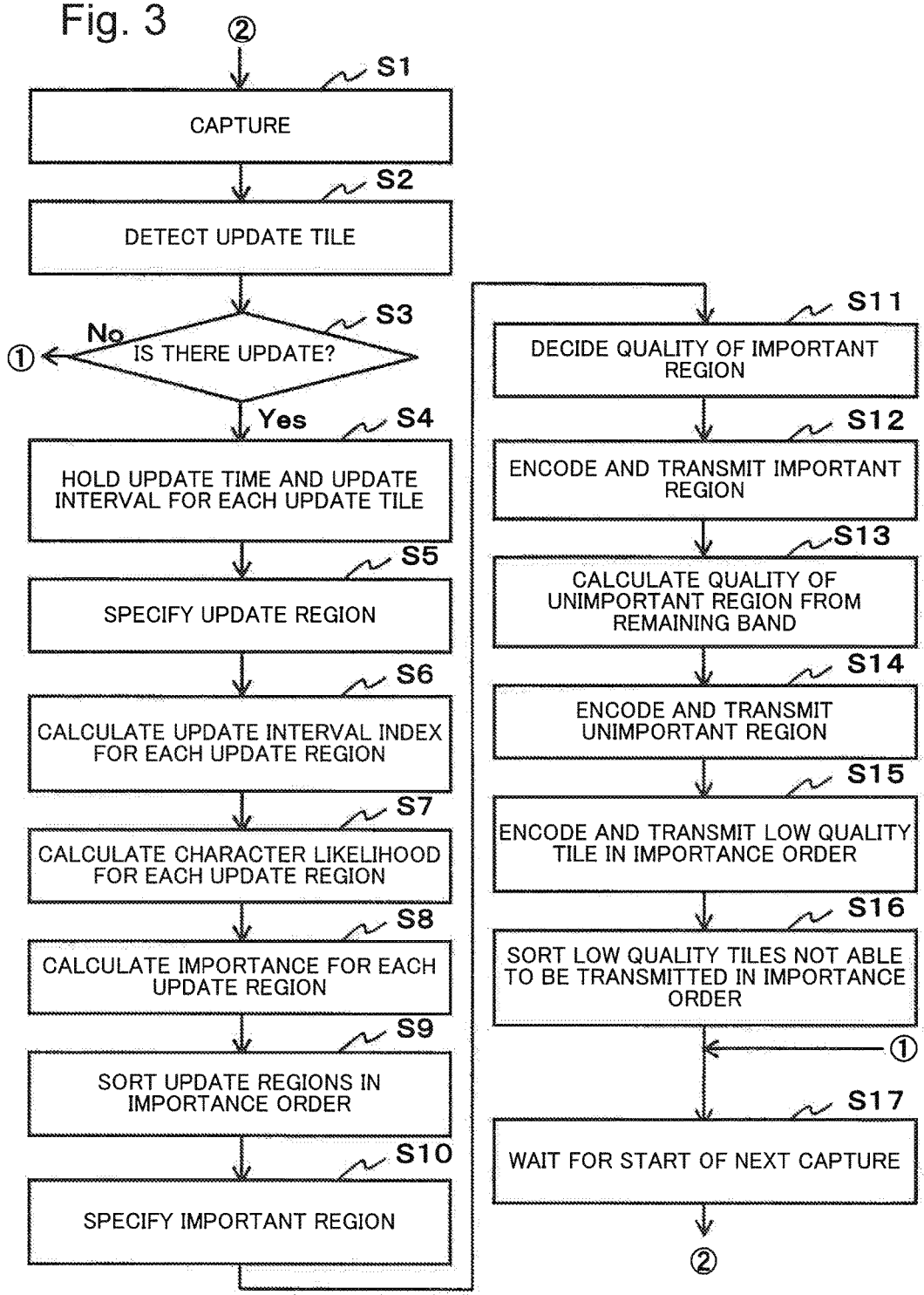
FIG. 3 is a flowchart illustrating an example of the progress of a procedure of the present invention.

Next, the progress of a procedure of the present invention will be described. FIG. 3 is a flowchart illustrating an example of the progress of a procedure of the present invention. When the latest frame is captured (step S1), the update region detection unit 2 detects an update tile from the latest frame (step S2). That is, the update region detection unit 2 compares the latest frame with a previous frame and detects a tile in which update occurs.

When there is no update tile in the latest frame (No of step S3), the procedure proceeds to step S17. Furthermore, when there is the update tile (Yes of step S3), the update region detection unit 2 rewrites an update time and an update interval of the update tile detected in step S2, which are stored in the tile information memory 3, (step S4). That is, the update region detection unit 2 calculates a difference between the update time (a time related to the latest frame) of the update tile and a previous update time stored in the tile information memory 3, thereby recalculating an update interval. Then, the update region detection unit 2 rewrites the update time and the update interval stored in the tile information memory 3, at the update time and the update interval. The update region detection unit 2 rewrites the update time and the update interval for each update tile detected in step S2.

Subsequently, the update region detection unit 2 specifies individual update regions (step S5).

Then, the update interval index calculation unit 4 calculates an update interval index for each update region (step S6). In the present exemplary embodiment, the update interval index calculation unit 4 calculates the occupation rate of a tile (a tile having an update interval equal to or more than a threshold value) having a long update interval among each tile overlapping the update region for each update region.

Furthermore, the character likelihood calculation unit 5 calculates character likelihood for each update region (step S7). In step S7, the character likelihood calculation unit 5 firstly calculates character likelihood for each tile in a frame. At this time, as already mentioned, the character likelihood calculation unit 5 may also obtain the histogram of the edge strength in the tile and employ the dispersion value thereof as the character likelihood. Then, the character likelihood calculation unit 5, for example, sequentially selects individual update regions one by one and calculates a statistical value (for example, an average value, a maximum value, a minimum value and the like) of character likelihood of each tile overlapping the selected update region as the character likelihood of the update region. The character likelihood calculation unit 5 may also calculate the character likelihood of each update region by using other methods.

Next, the importance calculation unit 6 performs weighted addition of an occupation rate of a tile having a long update interval and character likelihood for each update region, thereby calculating importance (step S8).

Furthermore, in step S8, the importance calculation unit 6 also calculates importance of each tile other than the update tile. At this time, it is sufficient if the importance calculation unit 6 decides importance of a tile to be a large value as a period from a previous update time to a time related to the latest frame is long and the character likelihood is large.

Then, the importance calculation unit 6 sorts respective update regions in an importance order (step S9). Next, the importance calculation unit 6 specifies an update region having importance equal to or more than a threshold value as an important region (step S10). Furthermore, in step S10, the importance calculation unit 6 decides update regions, other than the important region among the respective update regions, as unimportant regions.

At this time, when a ratio of an area of an entire important region with respect to an area of an entire update region is equal to or more than a predetermined value (for example, 8%), the importance calculation unit 6 may also decide the entire update region as the unimportant regions. As described above, in the case in which the ratio of the important regions is equal to or more than the predetermined value, when the entire update region are decided as the unimportant regions and it is not possible to detect significant deviation of importance among update regions, the process of step S11 to be described later is not performed. As a consequence, it is possible to suppress an adverse influence due to erroneous determination.

After the important regions is specified, the quality control unit 7 divides the total target code amount in the frame proportionally according to a ratio (that is, an area of the entire important region/an area of the entire update region) of the area of the entire important region with respect to the area of the entire update region and adds a constant value to the proportional division result. The quality control unit 7 employs a result of the addition as a target code amount of the entire important region. In addition, as described above, the quality control unit 7 may also perform constant rate multiplication with respect to the proportional division result, thereby calculating the target code amount of the entire important region.

Then, the quality control unit 7 obtains a quality value for the entire important region by using the target code amount of the entire important region (step S11). For example, the quality control unit 7 calculates the degree of complexity of the entire important region. The dispersion of image signal values of the entire important region can be used as the degree of complexity. It is sufficient if the quality control unit 7 holds in advance a database indicating a correspondence relation among the target code amount, the complexity, and the quality value and specifies a quality value related to the target code amount and complexity of the entire important region. In addition, the quality control unit 7 may also specify the quality value by using other methods.

Next, the important region encoding unit 8 encodes the entire important region on the basis of the quality value decided in step S11. Then, the transmission unit 13 transmits encoded data of the entire important region to the thin client (step S12).

Subsequently, the quality control unit 7 specifies a quality value of an unimportant region from a remaining bane (step S13). In addition, although not illustrated in FIG. 13, immediately before step S13, the intra update tile candidate selection unit 11 refers to the quality values of each tile held by the tile quality holding unit 9, and selects all tiles (that is, low quality tiles) having quality values equal to or less than a threshold value among each tile other than the update tiles.

Figure 4:
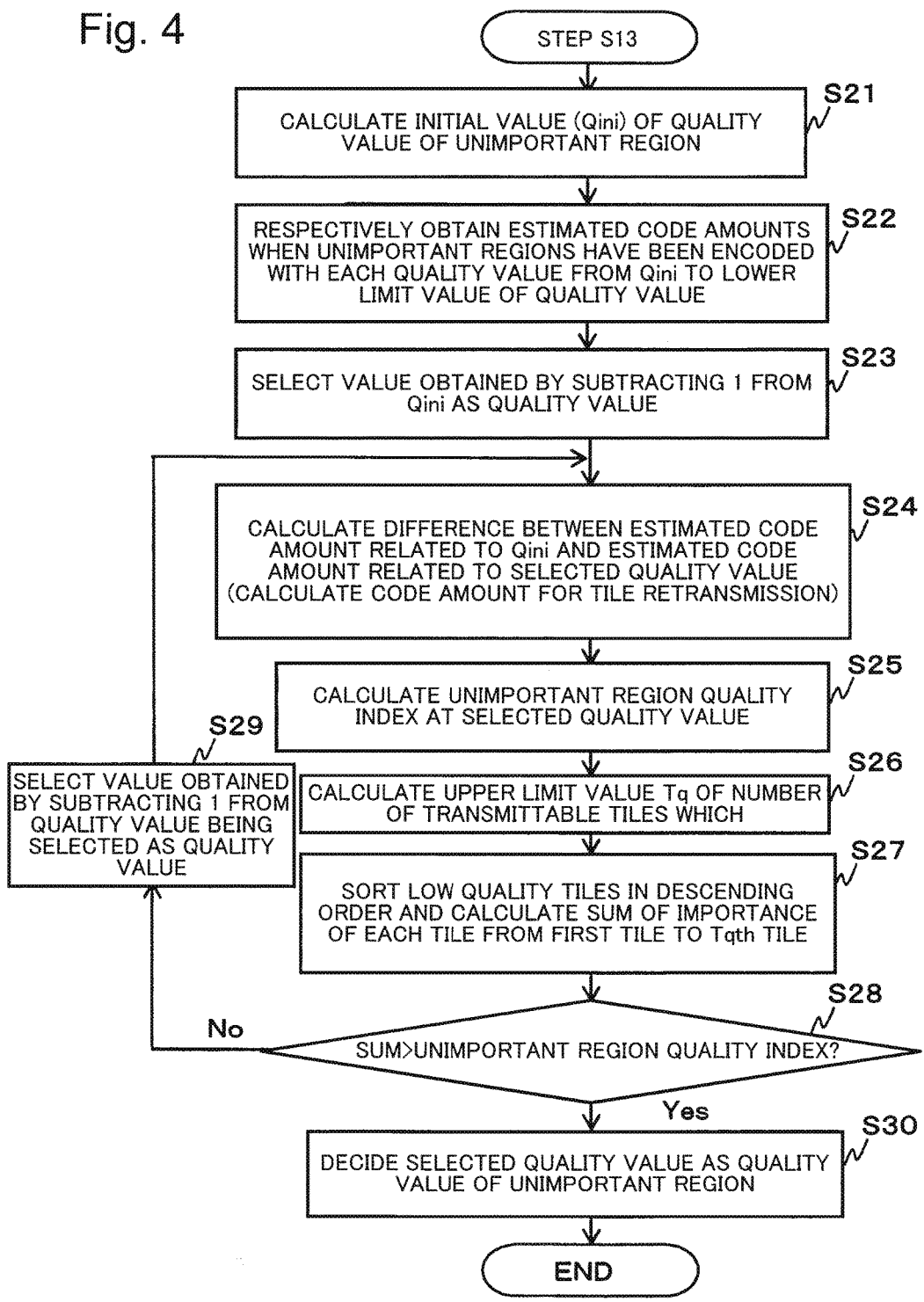
FIG. 4 is a flowchart illustrating the progress of a process of step S13.

Hereinafter, the process of step S13 will be described. FIG. 4 is a flowchart illustrating the course of the process of step S13. The quality control unit 7 calculates a quality value in the case of encoding an entire unimportant region by using all remaining bands obtained by subtracting a code amount of a result obtained by encoding the entire important region in step S12 from the total target code amount in the frame, and employs the quality value as an initial value of a quality value (step S21). Hereinafter, the initial value will be written as Qini.

Next, the quality control unit 7 respectively obtains estimated code amounts when the entire unimportant region has been encoded with each quality value from Qini to a lower limit value (set to 1) of the quality value (step S22). For example, Qini is assumed to be 9. In this case, the quality control unit 7 respectively obtains estimated code amounts when the entire unimportant region has been encoded with each quality value of 9, 8, . . . 1.

Herein, the process of step S22 will be described employing, as an example, the case in which the quality control unit 7 holds, as a database, information indicating a correspondence relation between the quality value and the code amount for each individual complexity degree as described above. In step S22, the quality control unit 7 obtains dispersion of image signal values of the entire unimportant region as the degree of complexity of the unimportant regions. It is sufficient if the quality control unit 7 specifies a code amount related to individual quality values with reference to information indicating a correspondence relation between the quality value and the code amount, which relates to the degree of complexity, and decides the code amount as an estimated code amount in the individual quality values. The calculation method of the estimated code amount is an example, and the quality control unit 7 may also derive the estimated code amount by using other methods.

Then, the quality control unit 7 selects a value obtained by subtracting 1 from Qini as a quality value (step S23).

Then, the quality control unit 7 calculates a difference between an estimated code amount related to Qini and an estimated code amount related to the selected quality value (step S24). The estimated code amount related to each quality value is obtained in step S22.

The difference between the estimated code amount related to Qini and the estimated code amount related to the selected quality value is a code amount which can be allocated as a code amount for tile retransmission when the quality value of the entire unimportant region has been lowered to a quality value being selected from Qini. As described above, the code amount for tile retransmission is a code amount available for the transmission of low quality tiles encoded for intra update.

Hereinafter, the quality value being selected will be written as q. Furthermore, the difference (the code amount for tile retransmission) calculated in step S24 will be written as Aq by using the quality value q being selected as a subscript.

After step S24, the quality control unit 7 calculates an unimportant region quality index at the quality value q being selected (step S25). The unimportant region quality index is an index representing the quality of the unimportant region. The unimportant region quality index will be written as Bq by using the quality value q being selected as a subscript. The quality control unit 7, for example, calculates Bq by calculation of the following Equation (1).

$$Bq = c*q*S \qquad \text{Equation (1)}$$

In Equation (1) above, S is the sum of areas of the unimportant regions. Furthermore, c is a constant (assumed to 250 in the present example) decided in advance.

Next, the quality control unit 7 calculates an upper limit value of the number of tiles which can be transmitted (step S26). The upper limit value of the number of tiles which can be transmitted will be written as Tq by using the quality value q being selected as a subscript.

In step S26, the quality control unit 7 divides the code amount Aq for tile retransmission obtained in step S24 by a tile code amount, thereby calculating the upper limit value Tq of the number of tiles which can be transmitted. Herein, the tile code amount is an estimated value of a code amount generated per one tile when a low quality tile has been retransmitted for intra update. The tile code amount is decided in advance. For example, it is assumed that the size of one tile is 32 pixels lengthwise and 32 pixels breadthwise. Furthermore, a typical compression rate of intra update is assumed to 1/15. Furthermore, it is assumed that RGB data of 3 bytes is included in one pixel. In this case, it is sufficient if the tile code amount is decided as 204 bytes (32*32*3/15). In this example, it is sufficient if the quality control unit 7 obtains Tq by dividing the code amount Aq for tile retransmission by 204.

Subsequently, the quality control unit 7 sorts the low quality tiles selected by the intra update tile candidate selection unit 11 in a descending order of the importance of tiles. Then, the quality control unit 7 calculates the sum of the importance of each tile from a first low quality tile to a $Tq^{th}$ low quality tile after the sorting (step S27).

Then, the quality control unit 7 determines whether the sum of the importance of the first low quality tile to the $Tq^{th}$ low quality tile exceeds the unimportant region quality index Bq calculated in step S25 (step S28). When the sum obtained in step S27 does not exceed Bq (No of step S28), the quality control unit 7 newly selects, as a quality value q, a value obtained by subtracting 1 from the quality value q being selected (step S29). Then, the quality control unit 7 performs the processes of step S24 and following steps with respect to the newly selected quality value q.

The quality control unit 7 repeats the loop processes of step S24 to step S29 until the sum obtained in step S27 exceeds Bq.

When the sum obtained in step S27 has exceeded Bq (Yes of step S28), the quality control unit 7 decides the quality value q selected at this time point as a quality value for the entire unimportant region (step S30) and ends step S13.

The entire unimportant region is encoded using the quality value q of the unimportant region selected when the sum obtained in step S27 has initially exceeded Bq, and intra update is performed for the first low quality tile to the $Tq^{th}$ low quality tile. In this case, it is possible to estimate that quality in the entire unimportant region and an entire quality tile from the first low quality tile to the $Tq^{th}$ low quality tile becomes maximum.

In addition, even in the case of selecting 1 that is a lower limit value of the quality value, when the sum obtained in step S27 is equal to or less than Bq, the quality control unit 7 decides Qini as the quality value of the entire unimportant region.

Figure 5:
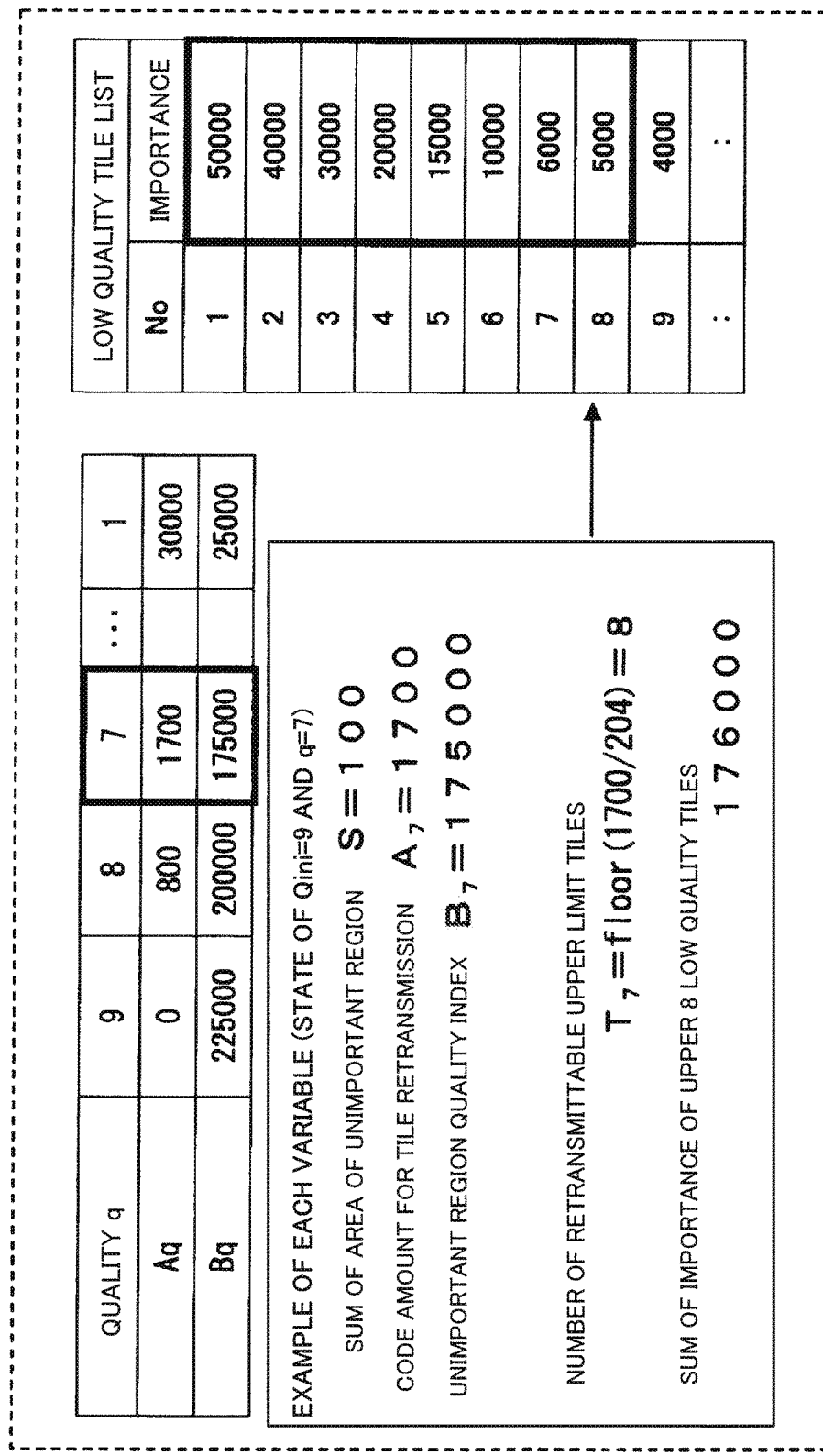
FIG. 5 is an explanation diagram illustrating a detailed example of Aq and Bq calculated in step S13 and a calculation example of a quality value for an entire unimportant region.

FIG. 5 is an explanation diagram illustrating a detailed example of Aq and Bq calculated in step S13 and a calculation example of the quality value for the entire unimportant region. FIG. 5 illustrates the case in which Qini is 9 and illustrates an example of Aq and Bq in 9, 8, . . . , 1. In addition, in the flowchart exemplified in FIG. 4, each quality value is sequentially selected from the value obtained by subtracting 1 from Qini. Accordingly, in the example illustrated in FIG. 4, Aq and Bq for Qini are not calculated, but are conveniently illustrated in FIG. 5. When a quality value 8 is selected, it is assumed that No has been determined in step S28. It is assumed that the quality control unit 7 selects a quality value 7 in step S29 and then obtains a code amount A7 (=1700) for tile retransmission in step S24. Furthermore, it is assumed that the sum S of areas of the unimportant regions is 100 and the quality control unit 7 obtains an unimportant region quality index B7 (=175000) in step S25.

Moreover, the quality control unit 7 divides A7 by the tile code amount (assumed to 204) in step S26, thereby obtaining the upper limit value T7 (=8) of the number of tiles which can be transmitted. In addition, the quality control unit 7 rounds down numbers after a decimal point of the division result. It is assumed that the result obtained by sorting the low quality tiles in a descending order is as exemplified in FIG. 5. The quality control unit 7 calculates the sum of importance of a first low quality tile to an eighth low quality tile. In the example illustrated in FIG. 5, this value is assumed to 176000. Then, since 176000 is larger than B7, the quality control unit 7 decides the quality value 7 being selected as the quality value for the entire unimportant region.

After step S13, the unimportant region encoding unit 10 encodes the entire unimportant region on the basis of the quality value decided in step S13. Then, the transmission unit 13 transmits encoded data of the entire unimportant region to the thin client (step S14).

Up to the process of step S14, the encoding and transmission of the update regions (the important region and the unimportant region) are completed. As already mentioned, in the present exemplary embodiment, it is assumed that an image change due to a moving image is not related to the update of display. That is, a moving image display region in a frame is not related to the update region. When there is the moving image display region in the frame, it is sufficient if the image encoding apparatus 1 encodes the moving image display region in the frame and transmits the encoded region to the thin client between step S14 and step S15 to be described later.

Next, in step S15, the intra update unit 12 encodes the low quality tiles with a quality value for intra update in an importance order within the range of a remaining band obtained by subtracting the total code amount at the time of start of step S15 from the total target code amount in the frame. Then, the transmission unit 13 transmits the encoded low quality tiles to the thin client (step S15). In step S15, the intra update unit 12 stops the encoding of the low quality tile if an accumulation value of code amounts of the low quality tiles subjected to the encoding and the transmission exceeds the remaining band. The transmission unit 13 transmits no low quality tiles at the time point at which the accumulation value of the code amounts of the low quality tiles has exceeded the remaining band. However, the intra update unit 12 encodes at least one low quality tile and the transmission unit 13 transmits the encoded low quality tile to the thin client.

By the process of step S15, the intra update is realized.

In addition, the intra update unit 12 postpones low quality tiles which cannot be transmitted in step S15 to next and following frames. The intra update unit 12 sorts the low quality tiles in an importance order such that they are transmitted in the next frame in an importance order (step S16).

Furthermore, on the basis of quality values decided for the important region and the unimportant region, the tile quality holding unit 9 recalculates quality values of tiles overlapping the important region and tiles overlapping the unimportant region, and respectively holds the quality values of these tiles.

After step S16, the image encoding apparatus 1 waits for the start of capture of a next frame (step S17). When the next frame is captured, the image encoding apparatus 1 performs the processes of step S1 and following steps with respect to the frame.

According to the present exemplary embodiment, as an update interval index (the occupation rate of a tile having a long update interval in the present example) and character likelihood are high, importance becomes high. Accordingly, it is highly probable that an update region (for example, a region related to a menu item and the like displayed in response to a user' operation), which has not been continuously updated for a while and has been suddenly updated, will be specified as an important region. Similarly, it is highly probable that an update region representing an update result character will also be specified as an important region. These regions are considered to be important regions meaningful to a user. The quality control unit 7 calculates a target code amount to be allocated to an entire important region so as to be larger than a result obtained by dividing the total target code amount in a frame proportionally according to "an area of the entire important region/an area of an entire update region" with respect to important regions of update regions. Then, the quality of important regions to be important to a user with high probability is preferentially made to be high as compared with other update regions (unimportant regions). Accordingly, a user can quickly understand the display content of important regions meaningful to the user.

Furthermore, when unimportant regions exist in update regions, the quality control unit 7 suppresses the quality values of the unimportant regions, thereby allocating code amounts for intra update in step S13 (steps S21 to S30 illustrated in FIG. 4). Furthermore, within the range of a remaining band after encoding and transmission for the unimportant regions, the intra update unit 12 encodes low quality tiles in a descending order of importance, and the transmission unit 13 transmits the encoded low quality tiles to the thin client. As a consequence, it is possible to preferentially realize image quality recovery of low quality tiles considered to be important to a user.

Figure 10:
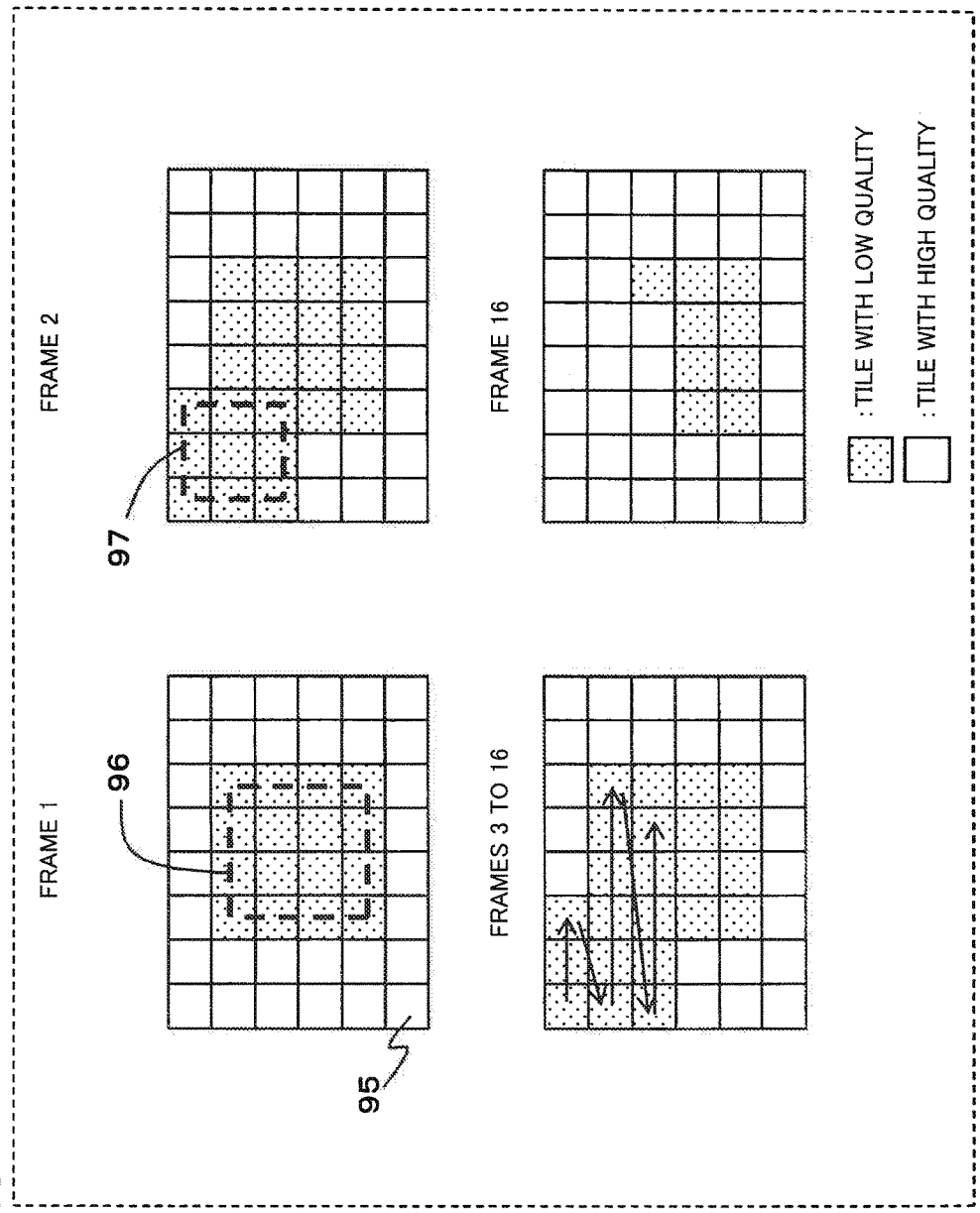
FIG. 10 is a schematic diagram illustrating an example of a change in the state of continuous frames.

An order of the intra update in the present invention as described above is compared with an order of intra update exemplified in FIG. 10. In the example illustrated in FIG. 10, priority becomes high toward low quality tiles positioned at an upper end of a screen. Furthermore, in tiles of the same stage, the priority becomes high toward left tiles when viewed from a user (see FIG. 10). Accordingly, general intra update exemplified in FIG. 10, when low quality tiles representing information meaningful to a user exist at a lower portion of the screen, a time is required for image quality recovery of the tiles. On the other hand, in the present invention, when the quality values of the unimportant regions have been suppressed and a code amount for intra update have been allocated, the intra update is preferentially performed from a low quality tile with high importance regardless of the positions of low quality tiles. Thus, it is possible to advance image quality recovery of low quality tiles considered to be important to a user.

Furthermore, when an update period of a tile is short, importance of the tile is set to be low. Accordingly, even though there is a region considered to display a character, importance becomes low in a tile steadily changed and related to a display region of an indicator and the like. In the tile steadily changed as described above, although image quality has been improved by the intra update, it is highly probable that next drawing update will occur for a short time and the image quality improvement due to the intra update becomes waste. Update steadily occurs, and importance of a tile having a short update interval is set to be low. Thus, for a low quality tile with high probability of being rewritten immediately although the image quality improvement due to the intra update has been achieved, the intra update unit 12 delays encoding. Accordingly, it is possible to increase a rate of intra update in a low quality tile considered to be important to a user, thereby improving average quality of an entire image.

Next, a modification of the aforementioned exemplary embodiment will be described.

The importance calculation unit 6 may also calculate importance of each update region on the basis of the update interval index (the occupation rate of a tile having a long update interval in the aforementioned example) without using character likelihood. Furthermore, even in the case of deciding importance of each tile other than the update tile, the importance calculation unit 6 may also use no character likelihood. In this case, the character likelihood calculation unit 5 may not be provided. Furthermore, the process of step S7 (see FIG. 3) may also be omitted.

Furthermore, in the aforementioned exemplary embodiment, the case in which the occupation rate of a tile having a long update interval is used as the update interval index has been described as an example. A value, other than the occupation rate of a tile having a long update interval, may also be used as the update interval index. For example, an average value of update intervals of each tile overlapping an update region may also be used as the update interval index. In this case, for each update region, it is sufficient if the update interval index calculation unit 4 calculates the average value of the update intervals of each tile overlapping the update region. In addition, in a large part of each tile overlapping the update region, an update interval is short, but in a few remaining tiles, the update interval may also become excessively long. In this case, it is preferable that the update interval index as an entire tile is a small value, but it is also considered that an average value of update intervals in the update region becomes large due to the presence of a few tiles having an excessively long update interval. In order to avoid such a case, it is preferable that the update interval index calculation unit 4 decides an upper limit value of update intervals of each tile in the case of calculating an average value of update intervals, replaces an update interval larger than the upper limit value with the upper limit value, and calculates an average value of update intervals of each tile.

Furthermore, in the aforementioned exemplary embodiment, the case in which the tile information memory 3 also stores an update interval together with an update time as information of each tile has been described as an example. If the information of the update time has been stored in the tile information memory 3, it is possible to calculate an update interval of an update tile in a newly captured frame. Thus, it may be possible to employ a configuration in which the tile information memory 3 stores no information of the update interval. However, even in such a case, the tile information memory 3 stores the information of the update time for each tile. An example of an operation aspect when the tile information memory 3 stores no update interval will be described below. In the present example, it is assumed that the process of step S4 is omitted and a previous update time of an update tile is stored in the tile information memory 3 at the time of start of step S6. When calculating an update interval index for each update region, the update interval index calculation unit 4 calculates a difference between the latest update time (a time related to the latest frame) of each update tile and the previous update time stored in the tile information memory 3. It is sufficient if the update interval index calculation unit 4 calculates an update interval from the calculation result and calculates an update interval index by using the update interval. Furthermore, it is sufficient if the update interval index calculation unit 4 calculates the update interval index and then rewrites the update time stored in the tile information memory 3, for each update tile. This operation aspect is an example of an operation aspect when the tile information memory 3 stores no update interval, and other operation aspects may also be employed.

Figure 6:
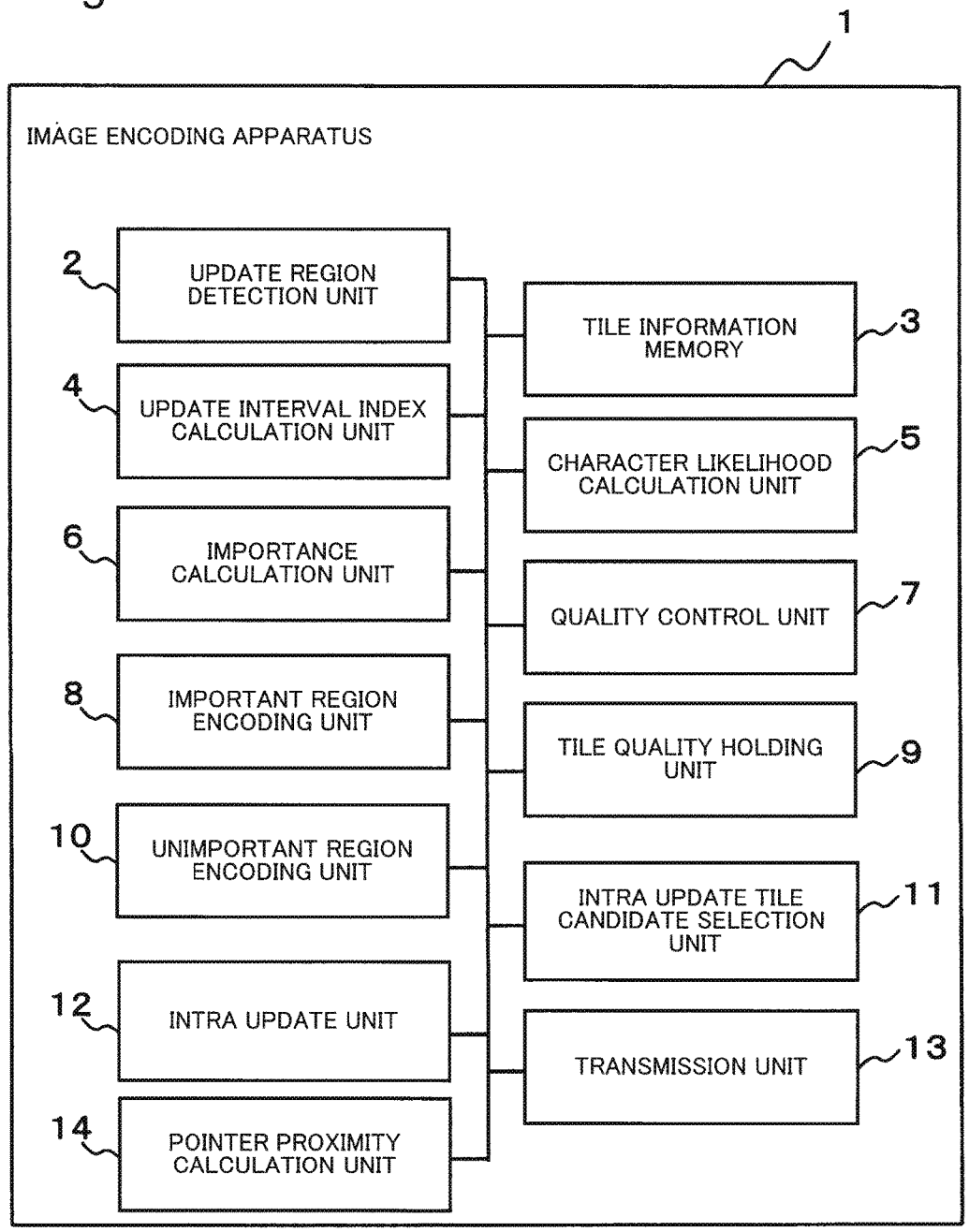
FIG. 6 is a block diagram illustrating a modification of an image encoding apparatus.

Furthermore, when deciding the importance of a low quality tile, a parameter representing a positional relation between a tile and a mouse when update has occurred in the tile within a constant time from a mouse operation may also be used. In detail, when the update has occurred in the tile within the constant time from the mouse operation, a reciprocal (hereinafter, written as a pointer proximity) of a distance between a central coordinate of the tile and a mouse coordinate at the time of the update may also be used. FIG. 6 is a block diagram illustrating an example of an image encoding apparatus in the present modification. The same reference numerals as those of FIG. 1 are used to designate elements similar to those already mentioned, and a description thereof will be omitted. An image encoding apparatus 1 in the present modification includes a pointer proximity calculation unit 14 (see FIG. 6).

When a mouse operation has been made, the pointer proximity calculation unit 14 stores the operation time of the mouse operation. When an update tile is detected from a frame representing display within a constant time (for example, 500 msec) from the time, a reciprocal of a distance between a mouse coordinate and a central coordinate of the update tile in the frame is calculated, so that the pointer proximity is calculated. The pointer proximity calculation unit 14 calculates pointer proximities for each update tile, and stores the pointer proximities in the tile information memory 3 as information related to individual update tiles.

Furthermore, when a frame representing display after the passage of a constant time (for example, 500 msec) from the operation time of the mouse is captured, all pointer proximities stored in the tile information memory 3 is made to be zero by the pointer proximity calculation unit 14.

Figure 7:
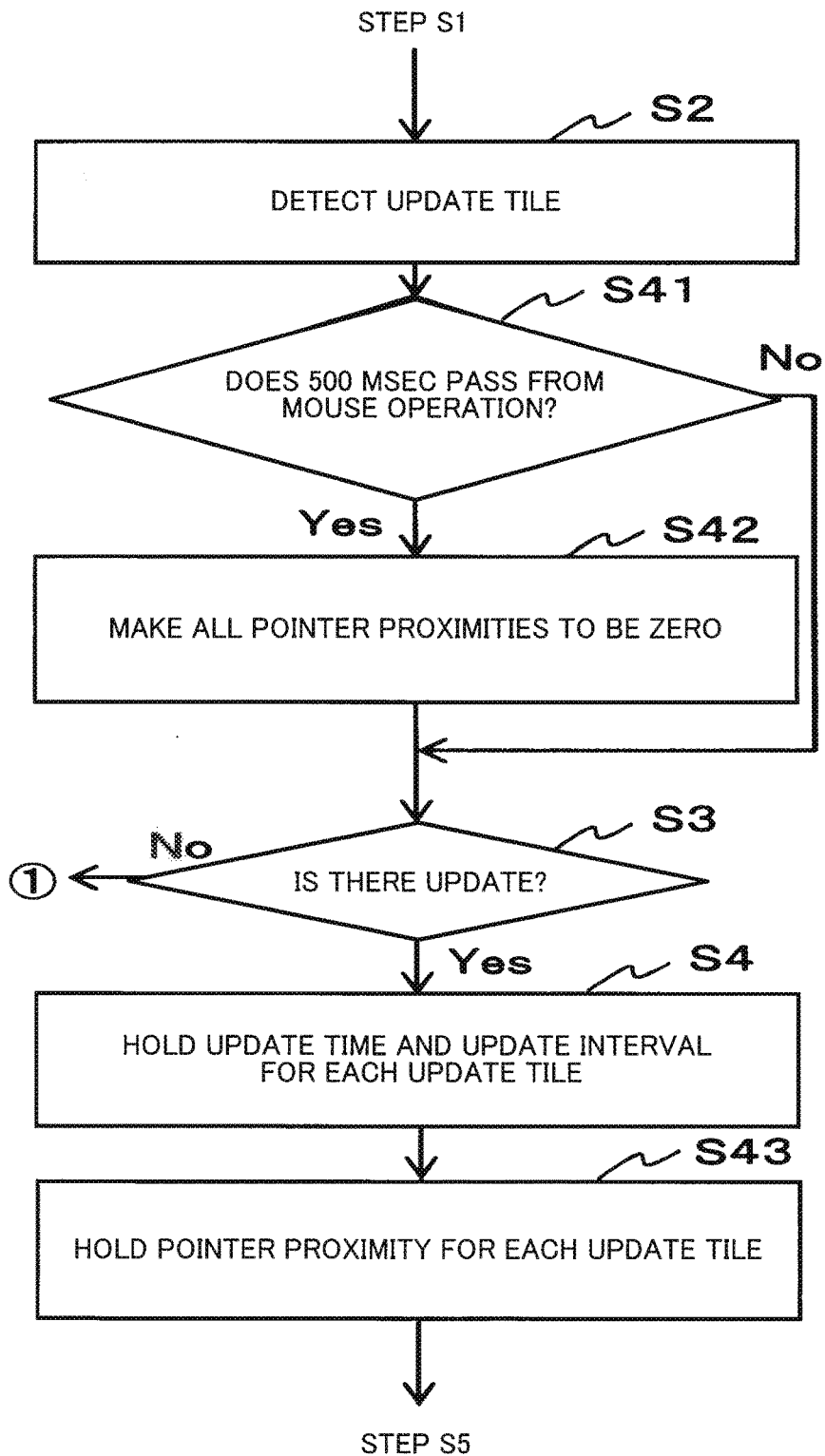
FIG. 7 is a flowchart illustrating an example of the progress of a process of a pointer proximity calculation unit.

FIG. 7 is a flowchart illustrating an example of the progress of a process of the pointer proximity calculation unit 14. The same step numbers as those of FIG. 3 are used to designate processes similar to those illustrated in FIG. 3. Furthermore, since a process before step S2 and processes after step S5 are similar to those illustrated in FIG. 3, they are omitted.

After step S2, the pointer proximity calculation unit 14 determines whether the frame representing display after the passage of the constant time (assumed to 500 msec in the present example) from the operation time of the mouse has been captured as the latest frame (step S41). When the frame representing the display after the passage of 500 msec from the operation time of the mouse has been captured (Yes of step S41), the pointer proximity calculation unit 14 makes all the pointer proximities stored in the tile information memory 3 to be zero (step S42).

Then, when there is an update tile in the captured frame (Yes of step S3), the update region detection unit 2 rewrites an update time and an update interval of the update tile (step S4). Since step S4 is similar to the operation already mentioned, a description thereof will be omitted.

After step S4, under the condition that the latest frame captured recently is a frame representing display within 500 msec from the operation time of the mouse, the pointer proximity calculation unit 14 calculates pointer proximities for each update tile detected from the latest frame. At this time, for each update tile, the pointer proximity calculation unit 14 calculates a reciprocal of a distance between a mouse coordinate and a central coordinate of the update tile in the latest frame as the pointer proximity. Then, the pointer proximity calculation unit 14 stores the pointer proximities of each update tile in the tile information memory 3 (step S43).

After step S43, the procedure proceeds to step S5 (see FIG. 3).

When the latest frame captured recently is the frame representing the display after the passage of 500 msec from the operation time of the mouse, the pointer proximity calculation unit 14 does not perform the aforementioned step S43. In this case, after step S4, the procedure proceeds to step S5 (see FIG. 3).

When the pointer proximity has been calculated for a tile by the process of step S43, the pointer proximity is stored in the tile information memory 3.

Processes after step S5 are similar to the processes after step S5 illustrated in FIG. 3. However, when the importance of each tile other than the update tile is decided, the importance calculation unit 6 also uses the pointer proximity of the tile. That is, the importance calculation unit 6 decides the importance of the tile as a large value as a period up to a time related to the latest frame is long, character likelihood is large, and the pointer proximity is large.

The fact that the pointer proximity of a tile is large represents that a mouse cursor exists in the vicinity of the tile when the tile has been updated. Accordingly, it can be said that the probability that the tile is a tile updated according to a mouse operation by a user is high. It can be said that a place updated according to the mouse operation is important to a user. As described above, the importance of a tile is decided as a large value as the pointer proximity is large, so that the priority of intra update of the tile is increased. Thus, it is possible to advance image quality recovery of the place (for example, a menu and the like displayed by a mouse operation for a tool bar) updated according to the mouse operation.

Furthermore, in the aforementioned exemplary embodiment, the case in which the update regions are classified into two groups of the important region and the unimportant region has been described. However, the importance calculation unit 6 may also classify the update regions into three or more groups in response to the importance of individual update regions. In this case, the quality control unit 7 suppresses the quality of the update regions, thereby ensuring a code amount for intra update of low quality tiles. As an example of this method, the following method may also be employed. In addition, hereinafter, it is assumed that the update regions are classified into N groups from first to $N^{th}$ groups in a descending order of importance.

The quality control unit 7 reduces a quality value of an entire update region of the $N^{th}$ group with the lowest importance by 1. In this way, a code amount when encoding the entire update region of the $N^{th}$ group is reduced, resulting in an increase in a surplus code amount (a code amount for tile retransmission). The quality control unit 7 calculates the number of low quality tiles which can be transmitted with the surplus code amount and a quality index of the entire update region of all the groups. Then, the quality control unit 7 reduces the quality value of the entire update region of the $N^{th}$ group by 1, thereby determining whether the quality of an entire frame is improved.

When the quality of the entire frame is improved, the quality control unit 7 reduces a quality value of an entire update region of a group (an $N-1^{th}$ group) with next lower importance by 1. Then, similarly to above, the quality control unit 7 calculates the number of low quality tiles which can be transmitted with a surplus code amount generated by reducing quality and a quality index of the entire update region of all the groups. Then, the quality control unit 7 reduces the quality value of the entire update region of the $N-1^{th}$ group by 1, thereby determining whether the quality of the entire frame is improved. When the quality of the entire frame is improved, the quality control unit 7 reduces a quality value of an entire update region of a group with next lower importance by 1 and reduces the quality value by 1 similarly to above, thereby determining whether the quality of the entire frame is improved.

The quality control unit 7 repeats processes similar to the above until it is determined that the quality of the entire frame is not improved. Furthermore, even when the quality of the first group with the highest importance has been reduced by 1, if it is determined that the quality of the entire frame is improved, the quality control unit 7 reduces the quality value of the entire update region of the $N^{th}$ group with the lowest importance by 1 again, thereby repeating similar processes.

Figure 8:
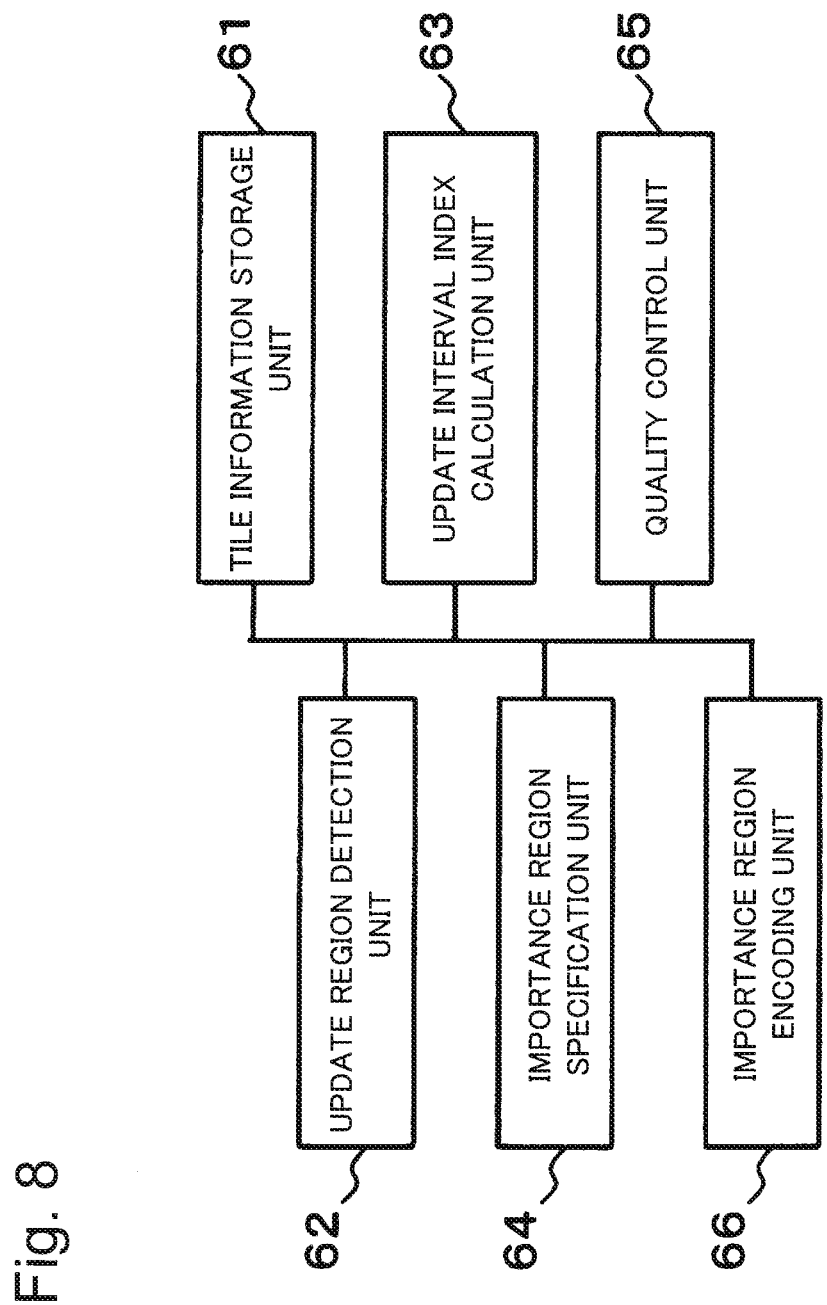
FIG. 8 is a block diagram illustrating an example of main units of an image encoding apparatus of the present invention.
Figure 9:
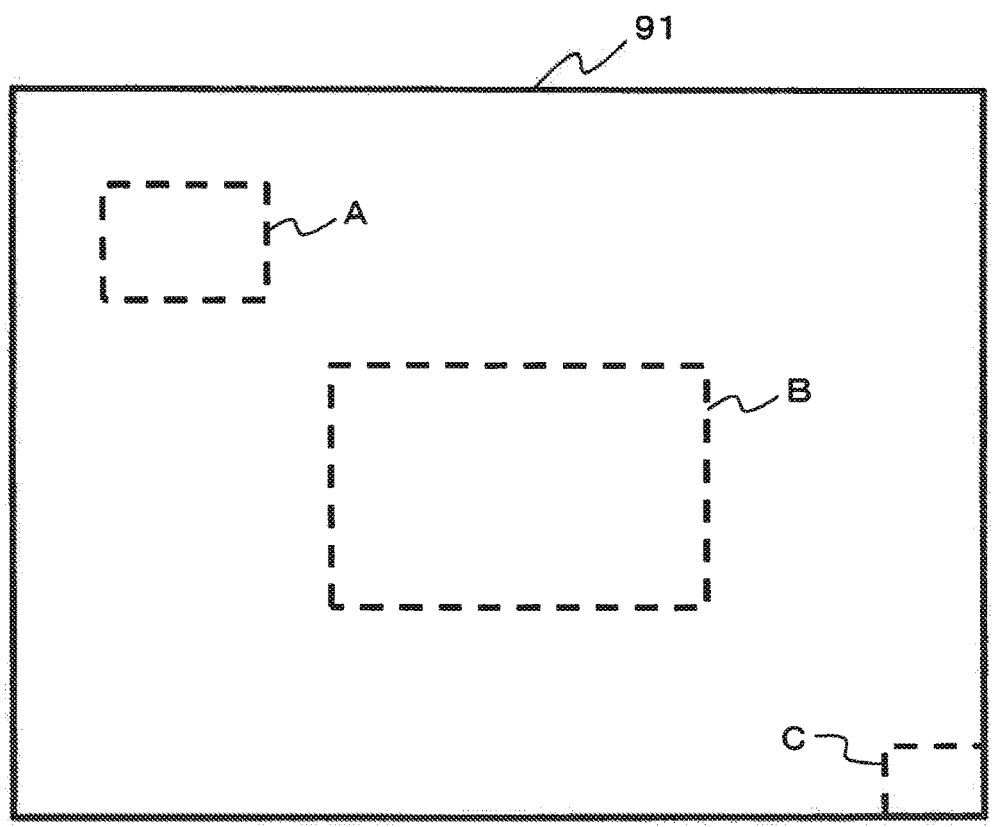
FIG. 9 is a schematic diagram illustrating an example of a frame in which some regions have been updated.

Next, main elements of the present invention will be described. FIG. 8 is a block diagram illustrating an example of main units of an image encoding apparatus of the present invention. The image encoding apparatus of the present invention includes a tile information storage unit 61, an update region detection unit 62, an update interval index calculation unit 63, an importance region specification unit 64, a quality control unit 65, and an importance region encoding unit 66.

The tile information storage unit 61 (for example, the tile information memory 3) stores an update time of a tile which is a region obtained by dividing a frame of an image into a predetermined size.

When the latest frame of the image has been provided, the update region detection unit 62 (for example, the update region detection unit 2) detects an update tile, which is a tile in which update occurs between the latest frame and a frame before the latest frame, and an update region which is a region where update occurs.

The update interval index calculation unit 63 (for example, the update interval index calculation unit 4) calculates an update interval index representing an index having a long update interval in an entire update tile overlapping the update region, for each update region.

The importance region specification unit 64 (for example, the importance calculation unit 6) specifies an important region from each update region by using the update interval index.

The quality control unit 65 (for example, the quality control unit 7) allocates a code amount, which is larger than a result obtained by dividing the total target code amount per one frame proportionally according to a ratio of an area of an entire important region with respect to an area of an entire update region, as a target code amount of the entire important region and specifies a quality value of the entire important region on the basis of the target code amount.

The importance region encoding unit 66 (for example, the importance region encoding unit 8) encodes the entire important region with the quality value.

According to such a configuration, the quality control unit 65 allocates the code amount, which is larger than the result obtained by dividing the total target code amount per one frame proportionally according to the ratio of the area of the entire important region with respect to the area of the entire update region, as the target code amount of the entire important region. Accordingly, it is possible to encode a region important to a user with high quality.

Furthermore, it may be possible to employ a configuration including a tile quality holding unit (for example, the tile quality holding unit 9), which updates and holds a quality value of a tile when a quality value for at least a part of regions in the tile has been decided, a low quality tile selection unit (for example, the intra update tile candidate selection unit 11), which selects a low quality tile that is a tile having a quality value equal to or less than a threshold value among tiles other than an update tile, the importance region specification unit 64 calculating the importance of each update region by using an update interval index, specifying an important region from each update region on the basis of the importance, and calculating the importance of each tile, other than the update tile, by using a passage time from an update time, the quality control unit 65 deciding a quality value of an entire unimportant region when encoding the entire unimportant region, which is a region not related to an important region of the update regions, as an initial value of the quality value of the entire unimportant region by using a code amount obtained by excluding a code amount when encoding the entire important region from the total target code amount per one frame, sequentially reducing the quality value of the entire unimportant region from the initial value, calculating the number of low quality tiles to be able to be subject to intra update, and specifying the quality value of the entire unimportant region when the quality of an unimportant region and an entire low quality tile to be able to be subject to the intra update is estimated to be maximum, an unimportant region encoding unit (for example, the unimportant region encoding unit 10), which encodes the entire unimportant region with the quality value, and an intra update unit (for example, the intra update unit 12) which encodes low quality tiles to be able to be subject to the intra update with a quality value for the intra update in an importance order.

Furthermore, it may be possible to employ a configuration including a character likelihood calculation unit (for example, the character likelihood calculation unit 5) which calculates character likelihood representing likelihood related to a display region of a character for each tile and decides character likelihood of each update region, and the importance region specification unit 64 may also calculate the importance of each update region by using the update interval index and the character likelihood and may also calculate the importance of the tile by using the passage time from the update time and the character likelihood.

Furthermore, it may be possible to employ a configuration including a pointer proximity calculation unit (for example, the pointer proximity calculation unit 14) which calculates a pointer proximity, which is a reciprocal of a distance between a central coordinate of a tile and a predetermined coordinate at the time of update when the update has occurred in the tile within a constant time from an operation (for example, a mouse operation) from an exterior to the predetermined coordinate, and the importance region specification unit 64 may also calculate the importance of the tile by using the passage time from the update time and the pointer proximity.

When the ratio of the area of the entire important region with respect to the area of the entire update region is equal to or more than a predetermined value, the importance region specification unit 64 may also decide the entire update region as the unimportant region.

For each update region, the update interval index calculation unit 63 may also calculate, as the update interval index, a long update interval tile occupation rate, which is a rate of the number of tiles having an update interval equal to or more than a threshold value, among the number of update tiles overlapping the update region.

For each update region, the update interval index calculation unit 63 may also calculate, as the update interval index, an average value of update intervals of each update tile overlapping the update region.

This application is based upon and claims the benefit of priority from Japanese Patent Application No. 2013-067035, filed on Mar. 27, 2013, the disclosure of which is incorporated herein in its entirety by reference.

Hereinafter, the invention of the present application has been described with reference to the exemplary embodiment, but is not limited to the aforementioned exemplary embodiment. Various medications understandable by those skilled in the art can be made in the configuration and details of the invention of the present application without departing from the scope of the invention of the present application.

INDUSTRIAL APPLICABILITY

The present invention is appropriately used in an image encoding apparatus which encodes an image in order to transmit the image to a thin client.

REFERENCE SIGNS LIST 1 image encoding apparatus
2 update region detection unit
3 tile information memory
4 update interval index calculation unit 5 character likelihood calculation unit
6 importance calculation unit
7 quality control unit
8 important region encoding unit
9 tile quality holding unit
10 unimportant region encoding unit
11 intra update tile candidate selection unit
12 intra update unit
13 transmission unit

The invention claimed is:

1. An image encoding apparatus comprising circuitry configured to:
   store an update time of a tile which is a region obtained by dividing a frame of an image into a predetermined size;
   detect an update tile, which is a tile in which update occurs between a latest frame and a frame before the latest frame, and an update region, which is a region where update occurs, when the latest frame of the image has been provided;
   calculate an update interval index representing an index having a long update interval in an entire update tile overlapping the update region, for each update region;
   specify an important region from each update region by using the update interval index;
   calculate a proportional division result by dividing a total target code amount, per one frame, proportionally according to a ratio defined as an area of an entirety of the important region to an area of an entirety of the update region;
   allocate a code amount, as an amount larger than the proportional division result, to be a target code amount of the entire important region, and specify a quality value of the entire important region on the basis of the target code amount; and
   encode the entire important region with the quality value.

2. The image encoding apparatus according to claim 1, wherein the circuitry is further configured to:
   update and hold a quality value of a tile when a quality value for at least a part of regions in the tile has been decided;
   select a low quality tile that is a tile having a quality value equal to or less than a threshold value among tiles other than the update tile,
   in the specifying an important region, calculate the importance of each update region by using the update interval index, specify an important region from each update region on the basis of the importance, and calculate the importance of each tile, other than the update tile, by using a passage time from an update time,
   in the specifying a quality value, decide a quality value of an entire unimportant region when encoding the entire unimportant region, which is a region not related to an important region of the update regions, as an initial value of the quality value of the entire unimportant region by using a code amount obtained by excluding a code amount when encoding the entire important region from a total target code amount per one frame, sequentially reducing a quality value of the entire unimportant region from the initial value,
   calculate a number of low quality tiles to be able to be subject to intra update, and
   specify the quality value of the entire unimportant region when quality of an unimportant region and an entire low quality tile to be able to be subject to intra update is estimated to be maximum;
   encode the entire unimportant region with the quality value; and
   encode low quality tiles to be able to be subject to the intra update with a quality value for the intra update in an importance order.

3. The image encoding apparatus according to claim 2, wherein the circuitry is further configured to:
   calculate character likelihood representing likelihood related to a display region of a character for each tile and decides character likelihood of each update region, and
   wherein, in the specifying an important region, calculate the importance of each update region by using the update interval index and the character likelihood and calculates the importance of the tile by using the passage time from the update time and the character likelihood.

4. The image encoding apparatus according to claim 2, wherein the circuitry is further configured to:
   calculate a pointer proximity, which is a reciprocal of a distance between a central coordinate of a tile and a predetermined coordinate at a time of update when the update has occurred in the tile within a constant time from an operation from an exterior to the predetermined coordinate, and
   wherein, in the specifying an important region, calculate the importance of the tile by using the passage time from the update time and the pointer proximity.

5. The image encoding apparatus according to claim 3, wherein the circuitry is further configured to:
   calculate a pointer proximity, which is a reciprocal of a distance between a central coordinate of a tile and a predetermined coordinate at a time of update when the update has occurred in the tile within a constant time from an operation from an exterior to the predetermined coordinate, and
   wherein, in the specifying an important region, calculate the importance of the tile by using the passage time from the update time and the pointer proximity.

6. The image encoding apparatus according to claim 1, wherein, when the ratio of the area of the entire important region with respect to the area of the entire update region is equal to or more than a predetermined value, in the specifying an important region, the circuitry is further configured to decide the entire update region as an unimportant region.

7. The image encoding apparatus according to claim 2, wherein, when the ratio of the area of the entire important region with respect to the area of the entire update region is equal to or more than a predetermined value, in the specifying an important region, the circuitry is further configured to decide the entire update region as an unimportant region.

8. The image encoding apparatus according to claim 3, wherein, when the ratio of the area of the entire important region with respect to the area of the entire update region is equal to or more than a predetermined value, in the specifying an important region, the circuitry is further configured to decide the entire update region as an unimportant region.

9. The image encoding apparatus according to claim 4, wherein, when the ratio of the area of the entire important region with respect to the area of the entire update region is equal to or more than a predetermined value, in the specifying an important region, the circuitry is further configured to decide the entire update region as an unimportant region.

10. The image encoding apparatus according to claim 1, wherein, for each update region, in the calculating an update interval index, the circuitry is further configured to calculate, as the update interval index, a long update interval tile occupation rate, which is a rate of a number of tiles having an update interval equal to or more than a threshold value, among a number of update tiles overlapping the update region.

11. The image encoding apparatus according to claim 2, wherein, for each update region, in the calculating an update interval index, the circuitry is further configured to calculate as the update interval index, a long update interval tile occupation rate, which is a rate of a number of tiles having an update interval equal to or more than a threshold value, among a number of update tiles overlapping the update region.

12. The image encoding apparatus according to claim 3, wherein, for each update region, in the calculating an update interval index, the circuitry is further configured to calculate as the update interval index, a long update interval tile occupation rate, which is a rate of a number of tiles having an update interval equal to or more than a threshold value, among a number of update tiles overlapping the update region.

13. The image encoding apparatus according to claim 4, wherein, for each update region, in the calculating an update interval index, the circuitry is further configured to calculate as the update interval index, a long update interval tile occupation rate, which is a rate of a number of tiles having an update interval equal to or more than a threshold value, among a number of update tiles overlapping the update region.

14. The image encoding apparatus according to claim 5, wherein, for each update region, in the calculating an update interval index, the circuitry is further configured to calculate as the update interval index, a long update interval tile occupation rate, which is a rate of a number of tiles having an update interval equal to or more than a threshold value, among a number of update tiles overlapping the update region.

15. The image encoding apparatus according to claim 1, wherein, for each update region, in the calculating an update interval index, the circuitry is further configured to calculate as the update interval index, an average value of update intervals of each update tile overlapping the update region.

16. The image encoding apparatus according to claim 2, wherein, for each update region, in the calculating an update interval index, the circuitry is further configured to calculate as the update interval index, an average value of update intervals of each update tile overlapping the update region.

17. An image encoding method comprising the processing of:
    detecting an update tile, which is a tile in which update occurs between a latest frame and a frame before the latest frame, and an update region, which is a region where update occurs, when the latest frame of an image has been provided;
    storing an update time of an update tile at a time of detection of the update tile and storing an update time for each tile;
    calculating an update interval index representing an index having a long update interval in an entire update tile overlapping the update region, for each update region;
    specifying an important region from each update region by using the update interval index;
    calculating a proportional division result by dividing a total target code amount, per one frame, proportionally according to a ratio defined as an area of an entirety of the important region to an area of an entirety of the update region;
    allocating a code amount, as an amount larger than the proportional division result, to be a target code amount of the entire important region, and specifying a quality value of the entire important region on the basis of the target code amount; and
    encoding the entire important region with the quality value.

18. The image encoding method according to claim 17, wherein the method further comprises:
    calculating importance of each update region by using the update interval index and specifying an important region from each update region on the basis of the importance;
    updating and holding a quality value of a tile when a quality value for at least a part of regions in the tile has been decided;
    selecting a low quality tile that is a tile having a quality value equal to or less than a threshold value among tiles other than the update tile;
    calculating importance of each tile, other than the update tile, by using a passage time from an update time;
    deciding a quality value of an entire unimportant region when encoding the entire unimportant region, which is a region not related to an important region of the update regions, as an initial value of the quality value of the entire unimportant region by using a code amount obtained by excluding a code amount when encoding the entire important region from a total target code amount per one frame, sequentially reducing a quality value of the entire unimportant region from the initial value, calculating a number of low quality tiles to be able to be subject to intra update, and specifying the quality value of the entire unimportant region when quality of an unimportant region and an entire low quality tile to be able to be subject to intra update is estimated to be maximum;
    encoding the entire unimportant region with the quality value; and
    encoding low quality tiles to be able to be subject to the intra update with a quality value for the intra update in an importance order.

19. A non-transitory computer readable medium that stores therein an image encoding program, which is applied to a computer including a tile information storage means which stores an update time of a tile which is a region obtained by dividing a frame of an image into a predetermined size, causing the computer to execute processing of:
    detecting an update tile, which is a tile in which update occurs between a latest frame and a frame before the latest frame, and an update region, which is a region where update occurs, when the latest frame of the image has been provided;
    calculating an update interval index representing an index having a long update interval in an entire update tile overlapping the update region, for each update region;
    specifying an important region from each update region by using the update interval index;
    calculating a proportional division result by dividing a total target code amount, per one frame, proportionally according to a ratio defined as an area of an entirety of the important region to an area of an entirety of the update region;
    allocating a code amount, as an amount larger than the proportional division result, to be a target code amount of the entire important region, and specifying a quality value of the entire important region on the basis of the target code amount; and encoding the entire important region with the quality value.

20. The image encoding program according to claim 19, wherein the processing further comprises:
updating and holding a quality value of a tile when a quality value for at least a part of regions in the tile has been decided;
selecting a low quality tile that is a tile having a quality value equal to or less than a threshold value among tiles other than the update tile, the importance region specification process including calculating importance of each update region by using the update interval index, specifying an important region from each update region on the basis of the importance, and calculating importance of each tile, other than the update tile, by using a passage time from an update time, the quality control process including deciding a quality value of an entire unimportant region when encoding the entire unimportant region, which is a region not related to an important region of the update regions, as an initial value of the quality value of the entire unimportant region by using a code amount obtained by excluding a code amount when encoding the entire important region from a total target code amount per one frame, sequentially reducing a quality value of the entire unimportant region from the initial value, calculating a number of low quality tiles to be able to be subject to intra update, and specifying the quality value of the entire unimportant region when quality of an unimportant region and an entire low quality tile to be able to be subject to intra update is estimated to be maximum;
encoding the entire unimportant region with the quality value; and
encoding low quality tiles to be able to be subject to the intra update with a quality value for the intra update in an importance order.

* * * * *